Figures 1, 2:
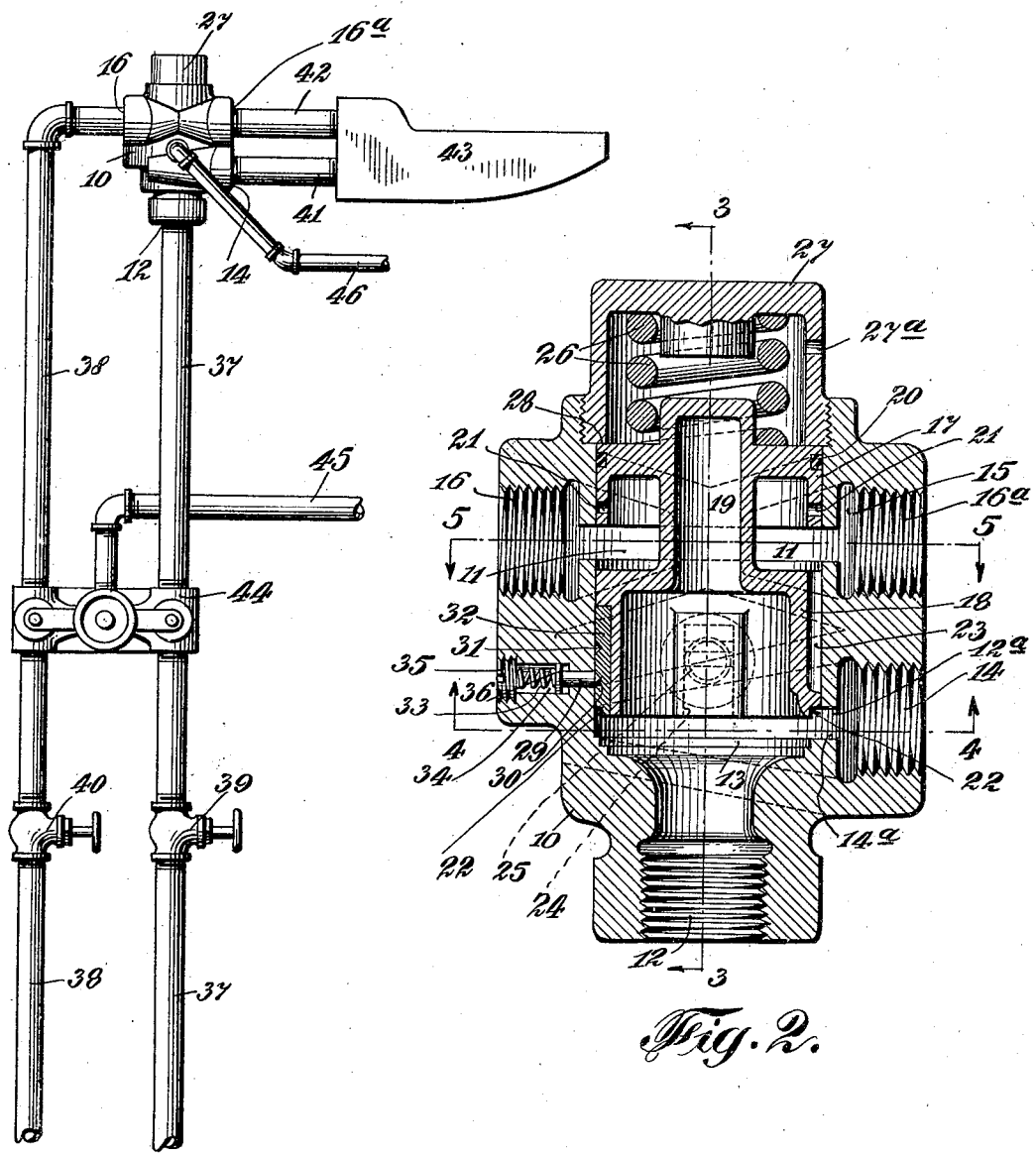

E. GROSSENBACHER.
AUTOMATIC VALVE FOR OIL BURNERS.
APPLICATION FILED MAR. 9, 1921.

1,398,549.

Patented Nov. 29, 1921.
2 SHEETS—SHEET 1.

Inventor
Ernest Grossenbacher

By Wilson Schrenk
his Attorneys

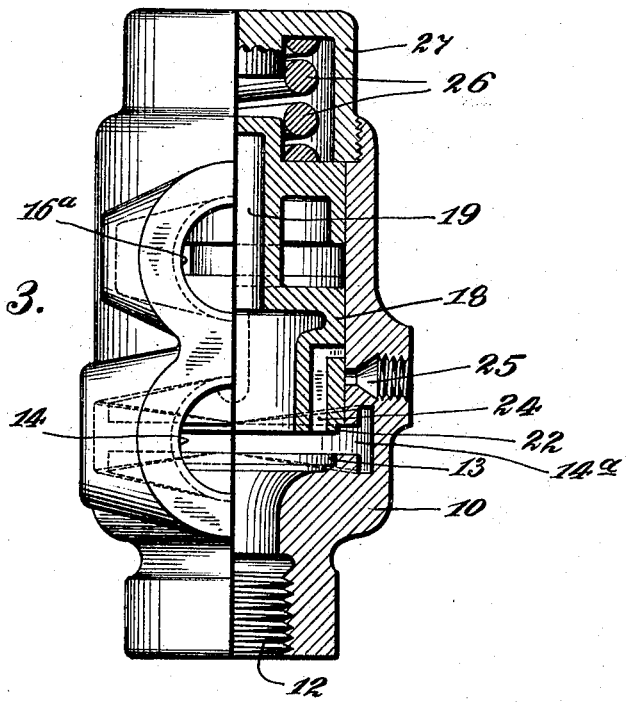
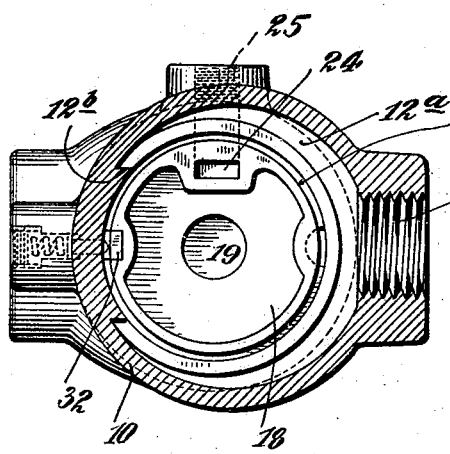
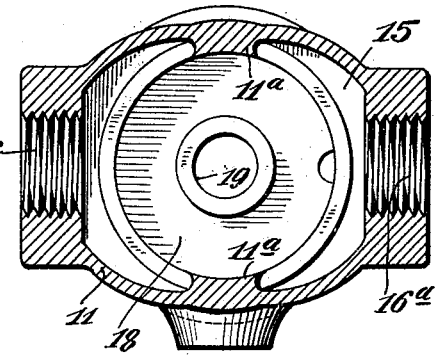

UNITED STATES PATENT OFFICE.

ERNEST GROSSENBACHER, OF FAJARDO, PORTO RICO.

AUTOMATIC VALVE FOR OIL-BURNERS.

1,398,549.   Specification of Letters Patent.   Patented Nov. 29, 1921.

Application filed March 9, 1921. Serial No. 450,847.

*To all whom it may concern:*

Be it known that I, ERNEST GROSSENBACHER, a citizen of the United States, and resident of Fajardo, Porto Rico, have invented certain new and useful Improvements in Automatic Valves for Oil-Burners, of which the following is a specification.

My invention relates to oil burners of the type in which an atomization agent such as steam is used for atomizing the fuel at the burner and has for its object to provide an automatic valve of novel construction and operation whereby the burner is automatically maintained in a clean condition of maximum efficiency and whereby puffing and irregular burning is eliminated. Other more specific objects will appear from the description hereinafter and the features of novelty will be pointed out in the appended claims.

In the accompanying drawings which illustrate an example of the invention without defining its limits, Figure 1 is a diagrammatic view illustrating an installation of the invention; Fig. 2 is a central section of the valve; Fig. 3 is a similar view on the line 3—3 of Fig. 2; Fig. 4 is a cross-section on the line 4—4 of Fig. 2; and Fig. 5 is a similar view on the line 5—5 of Fig. 2.

As shown in the drawings, the valve comprises a valve body 10 having a cylindrical interior chamber 11 which is in axial registry with a fuel inlet 12 with which said valve body 10 is provided; a valve seat 13 is located at the inner end of said fuel inlet 12 which communicates with a circumferentially extending channel 12ª in the body 11 and which is interrupted by an inwardly extending boss 12ᵇ to form closed ends, as shown in Fig. 4. The channel 12ª communicates with a fuel outlet 14, preferably by way of a reduced end 14ª, said outlet extending transversely to the fuel inlet 12, as shown in Fig. 2. A steam channel 15 is formed in the wall of the chamber 11 and is interrupted at diametrically opposite points by ribs 11ª formed on the wall of the chamber 11 and communicates respectively with the reduced ends of a steam inlet 16 and a steam outlet 16ª respectively, preferably located at diametrically opposite points, as illustrated in Figs. 2 and 5. The valve comprises further a hollow double piston slidably fitting the ribs 11ª and boss 12ᵇ of the chamber 11 and consisting of two sections 17 and 18 spaced apart and connected by means of a connecting neck 19, the section 17 being preferably, though not necessarily, of about half the width of the section 18 in axial directions. The piston section 17 is packed or rendered steam-tight in any suitable manner, as by means of piston rings 20 and is provided in its peripheral wall with openings 21 located in registry with each other at diametrically opposite points. The piston section 18 is formed with an annular shoulder 22 for coöperation with the valve seat 13 to control the fuel inlet 12, and is provided further in its peripheral surface with a steam groove or channel 23 extending in an axial direction and terminating at one end in the end wall of the section 18 and having its other end adapted to be brought into registry with the end 14ª of the fuel outlet 14 for the purpose to be more fully described hereinafter. In addition, the piston section 18 is provided with a fuel duct 24, the inlet end of which opens toward the fuel inlet 12 and the outlet end of which is located in the peripheral surface of the section 18 and is arranged to be brought into registry with an outlet 25 in the valve body 10 for the purpose to be more fully described hereinafter. A coil spring 26 is located within a hollow cap 27 which is screwed upon the body 10 and bears with its one end against said cap 27 and with its other end against the piston section 17, said spring exerting a tension tending to maintain the piston on the seat 13 and to return it thereto; in the illustrated example, the cap forms an inwardly extending annular shoulder 28 whereby the opening movement of the piston is arrested and further is provided with one or more vents 27ª as shown in Fig. 2. In addition to the parts so far described, the valve includes a retaining device of any suitable construction and which, as shown, may comprise a retaining plunger 29 slidably mounted in the body 11 and arranged to coöperate with notches 30 and 31 to retain the piston in its two extreme positions, said notches being preferably formed in a block 32 of hardened steel or other metal set into the piston section 18 at the proper place. The plunger 29 is resiliently pressed in a direction toward the axis of the valve by means of a spring 33 located in a recess 34 of the body 10 and bearing against an adjustable abutment in the form of a screw plug 35 mounted in said body 10 in registry with said recess; the plunger 29 is provided with a head 36 which prevents it from being forced completely out of its intended location and which constitutes an abutment for one end of the spring 33.

In practice, the valve is installed in the oil and steam lines, for instance as shown diagrammatically in Fig. 1, the fuel inlet 12 being connected by means of a pipe 37 with a source of fuel supply while the steam inlet 16 is connected by means of a pipe 38 with a source of steam supply, the pipes 37 and 38 being provided respectively with valves 39 and 40; the outlets 14 and 16ᵃ on the other hand are connected respectively by pipes 41 and 42 with the burner 43 which may be of any conventional form and construction. For the purpose of illustration and description, it will be assumed that the burner is used for heating a steam boiler to generate steam therein. In the preferred arrangement, in installations of the indicated character, the pipes 37 and 38, instead of leading directly to supplies of fuel and steam respectively, communicate with an automatic regulator 44 of any existing type, which may be located between the valves 39 and 40 and the present automatic valve, as shown in Fig. 1 and which is connected with the boiler by means of a pipe 45. By means of the regulator 44, the operation of the burner is automatically controlled in accordance with the steam pressure and other conditions existing in the boiler; in such cases, the regulator in turn is connected with sources of fuel and steam or other atomizing agents by pipes which are substantially continuations of the pipes 37 and 38 and are so indicated in Fig. 1, it being understood that the valve 39 is fully open when the burner is in operation. The present automatic valve in the drawings is shown in the position of full burner operation, the valve piston being raised and held by means of the retainer plunger 29, and the steam groove 23 and fuel duct 24 being out of registry with the outlets 14 and 25 respectively and closed. In this condition of the parts, steam or other atomizing agent passes from the pipe 38 through the inlet 16, channel 15 and outlet 16ᵃ through the pipe 42 and to the burner, and oil flows from the pipe 37 through the inlet 12, channel 12ᵃ and outlet 14 through the pipe 41 to said burner; the pressure of the incoming oil compresses the air within the piston section 18 and neck 19 and thus forms a cushion which exerts a force finally becoming great enough to overcome the restraining effect of the retaining device 29 and tending to force and maintain the piston to and in its raised position and assisting the plunger 29 in effecting this result.

If the steam pressure in the steam boiler rises to its maximum, for instance very rapidly, as may be the case in a locomotive or steam boat boiler where the load changes are very severe, the action of the regulator 44 will, in accordance with its method of operation, automatically reduce the oil supply so that the amount of oil used may become very small and thus results in a drop in the oil pressure between said regulator 44 and the burner 43. As the amount of oil which flows from the burner may therefore become very irregular, the intensity of the flame may be very unsteady and with ordinary equipment may culminate in successive slight explosions or puffs. The latter are entirely eliminated by the automatic action of the improved valve described herein; that is to say, as the oil pressure drops in the pipe 37 between the aforesaid regulator and the burner 43, the air which, as previously mentioned, has been compressed within the piston section 18 and neck 19 will, because of the reduction in oil pressure, expand and push the oil out through the outlet 14. As soon as said oil pressure has dropped to a predetermined point, the spring 26 will overcome the holding force of the plunger 29 and instantaneously close the oil valve, that is, push the valve piston to its lower position in engagement with the seat 13. As soon as the valve piston is in this position, the oil duct 24 will register with the outlet 25 so that the small amount of oil still flowing from the aforesaid regulator will pass through said duct 24 and outlet 25, from which it may be conducted, by means of a return pipe 46, back to the suction line of the oil pressure pump. When the valve piston is in its lowered position, the outlet end of the groove 23 will register with the oil outlet 14 while the steam passage is closed by the piston section 17, the apertures 21, however, being in registry with the reduced ends of the inlet 16 and outlet 16ᵃ respectively. Thus, the steam passing into the inlet 16 will flow through the one aperture 21 into the space surrounding the neck 19 and then partly through the other opening 21 into the steam pipe 42 and burner 43, where it is used to prevent deterioration of the burner and partly through the groove 23 and outlet 14 to the oil pipe 41 leading to the burner 43 where said steam serves to blow out the oil from the burner and to clean the same. As the steam pressure in the boiler drops, the supply of steam and oil to the burner 43, because of the automatic action of the aforementioned regulator 44, will be increased so that the oil pressure coming through the inlet 12 will be correspondingly raised because of the relatively small dimension of the oil duct 24, which prevents an unrestricted outflow of oil whereby the air contained in the piston section 18 and the neck 19 is again compressed. As soon as the pressure is sufficiently high, the retaining force of the plunger 29 plus the opposing force of the spring 26 will be overcome, whereby the valve piston is instantaneously returned to its raised position in which the duct 24 and groove 23 are again closed and the steam and oil passages again fully opened up. The burner will now again be ignited by the customary pilot burner and produce a steady flame.

If the burner 43 becomes clogged, for instance because of impurities or foreign matter in the oil, and it should be desired to clean said burner while it is in full operation, the valve 39 in the oil line 37 is closed, thereby causing the oil pressure between said valve 39 and the burner to drop, and consequently bringing about the actuation of the automatic valve in the manner previously described which results in steam or other atomizing agent being directed through the oil passage of the burner and blowing therefrom the matter which clogs said burner. This action continues as long as the valve 39 remains closed; as soon as said valve is again opened and the customary oil pressure restored, it will actuate the automatic valve as previously described and again direct oil and atomizing agent through the proper ducts to the burner 43. It is evident, therefore, that the automatic valve which forms the subject matter of the description herein will operate not only in conjunction with a regulator 44 but also without the same.

The valve is extremely simple in construction and efficient in operation and automatically maintains the burner in a clean condition of maximum efficiency.

Various changes in the specific form shown and described may be made within the scope of the claims without departing from the spirit of my invention.

I claim:

1. An automatic valve comprising a casing having a plurality of inlet and outlet passages for predetermined media, and a valve controlling said passages and itself controlled in at least one direction by one of said media, and in one position causing one of said media to pass through all of said outlet passages.

2. An automatic valve for oil burners comprising a casing having inlet and outlet passages for the oil and inlet and outlet passages for an atomizing agent, a valve controlling all of said passages and movable to an open position by the pressure of the oil, means for closing said valve as the oil pressure drops and means whereby the atomizing agent is directed into the oil outlet passage when said valve is closed.

3. An automatic valve for oil burners comprising a casing having inlet and outlet passages for the oil and inlet and outlet passages for an atomizing agent, a valve controlling all of said passages and movable to an open position by the pressure of the oil, a retaining device coöperating with the oil pressure to maintain said valve in its open position and means dominating said retaining device whereby said valve is closed when the oil pressure drops, said valve being provided with a channel whereby the atomizing agent is directed into the oil outlet passage when said valve is closed.

4. An automatic valve for oil burners comprising a casing having inlet and outlet passages for the oil and inlet and outlet passages for an atomizing agent, a valve controlling all of said passages and movable to an open position by the pressure of the oil, and means for closing said valve as the oil pressure drops, said valve being provided with openings and with a channel whereby the atomizing agent is caused to partly pass through the outlet passage for the atomizing agent and partly through the oil outlet passage in the closed position of said valve, the latter further having a fuel duct through which oil may flow when said valve is closed.

5. The combination of an oil burner connected with a source of fuel and with a source of an atomizing agent and means whereby, when the fuel pressure drops, the atomizing agent is automatically directed through the burner to clean the same.

6. The combination of an oil burner connected with a source of fuel and with a source of an atomizing agent and a valve in said connection automatically controlled by the pressure of the fuel whereby, when said pressure drops, the atomizing agent is directed partly through the atomizing connection and partly through the burner to clean the same.

7. The combination of an oil burner connected with a source of fuel and with a source of an atomizing agent, a valve in said connection adjustable to its open position by the pressure of the fuel and arranged to permit the passage of fuel to the burner and atomizing agent through the atomizing connection, a retaining device coöperating with the fuel pressure to maintain said valve in its open position and a spring dominating said retaining device whereby said valve is closed when the fuel pressure drops, said valve being provided with a channel whereby the atomizing agent is directed through the burner to clean the same, in the closed position of said valve.

8. The combination of an oil burner, a burner regulating device connected with a source of fuel and with a source of atomizing agent, connections from said regulating device to said burner, a valve controlling said connections and itself controlled, in one direction, by the pressure of the fuel and means in said valve whereby, when the fuel pressure drops, the atomizing agent is directed through the burner to clean the same.

In testimony whereof I have hereunto set my hand.

ERNEST GROSSENBACHER.